Figure 6:
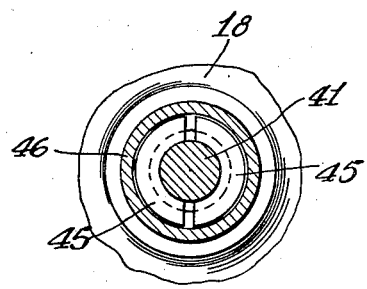

Nov. 2, 1937. W. W. MOHR 2,097,698
VALVE
Filed Nov. 20, 1933 2 Sheets-Sheet 1
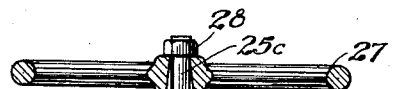
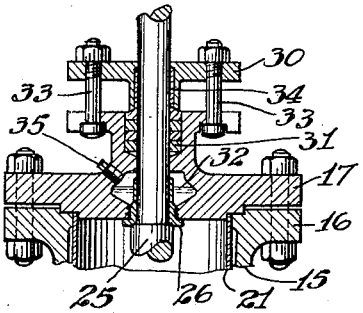
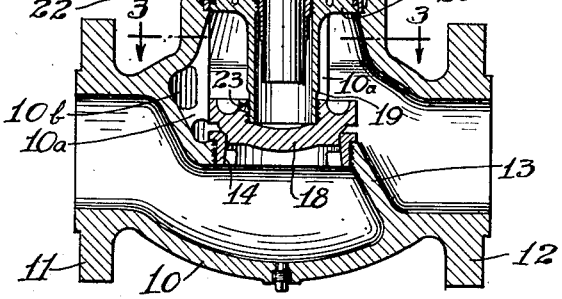
INVENTOR.
WALTER W. MOHR.
BY Albert E. Bell
ATTORNEY.

Nov. 2, 1937.     W. W. MOHR     2,097,698
VALVE
Filed Nov. 20, 1933     2 Sheets-Sheet 2

INVENTOR.
WALTER W. MOHR.
BY Albert C. Bell
ATTORNEY.

Patented Nov. 2, 1937

2,097,698

UNITED STATES PATENT OFFICE 2,097,698

VALVE

Walter W. Mohr, Hammond, Ind., assignor to The Edward Valve & Manufacturing Co., Inc., East Chicago, Ind., a corporation of Indiana Application November 20, 1933, Serial No. 698,771

6 Claims. (Cl. 251—44)

My invention relates to an improved construction of valves by which the main portions of the valves are of the same construction for different types of valves, for example for stop valves, for stop and check valves and for check valves.

It will be understood that in connection with manufacturing valves for controlling fluid flow, of the classes referred to, it is important that the valve disks and seats in particular, shall be made of non-corrosive and wear resisting metal which is usually alloy steel and relatively expensive, and heretofore the manufacture of valves of different kinds and sizes and the stocking of such valves, have involved large expense, particularly where the valves are of large sizes, on account of the parts of each valve being constructed particularly for that valve and not being arranged so that they are interchangeable with corresponding parts of other valves.

By my invention I construct valves of the several classes referred to, so that the valve disks, the valve seats and the bodies of the valves are identically the same whether the valves be stop valves, stop and check valves or checkvalves. Furthermore, for the stop and check valves and for the check valves referred to, I provide dash pot constructions for convenient and interchangeable attachment to the valve disks, which dash pot constructions are identical for the two classes of valves last mentioned. Where it is desired to make use of my improved construction for check-valves, all of the parts that are special for that class of valves, are the covers closing the dash pot compartments, and where the said construction is used to make stop and check valves, the only special parts required are the bonnets and stems mounted therein for holding the valve disks closed when desired. To construct the stop valves, the dash pot construction is not employed, and the special parts required are the bonnets and the valve stems, which stems are connected by special fittings with the interchangeable valve disks. In this manner, parts for an extensive line of valves of the three classes referred to, may be constructed and stocked in different sizes in readiness for sale by the manufacturer and assembled for one purpose or another according to the requirements of any purchaser, at much less expense than if special parts were required throughout for each class of valves. My invention also permits the ready changing of a valve of one of the classes referred to, to a valve of another of said classes while the valve is connected with the piping with which it is to operate, where, for example, it is desired to change the valve from a plain check valve to a stop and check valve, or to a stop valve.

By my invention I also provide an improved valve construction by which the valve disk is positively guided, and by which a comparatively unrestricted flow path is provided for fluid passing through the valve body.

My invention will best be understood by reference to the accompanying drawings showing a preferred embodiment thereof, in which—

Figure 5:
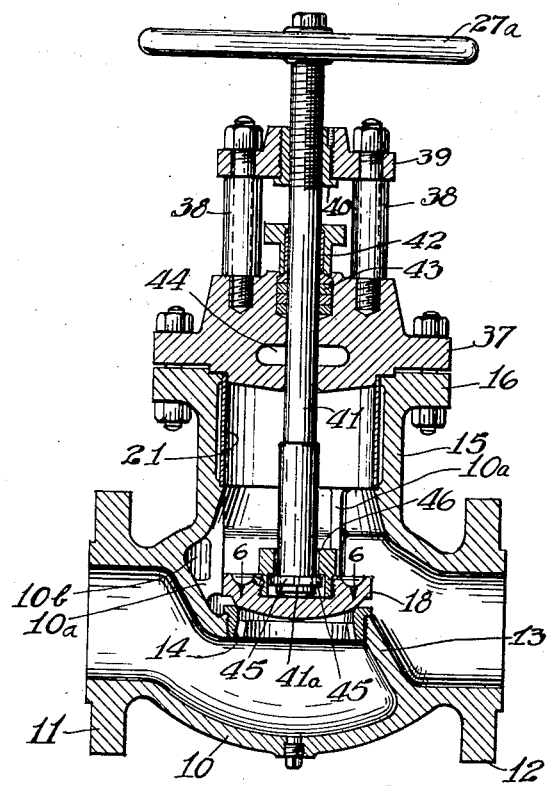
Figure 4:
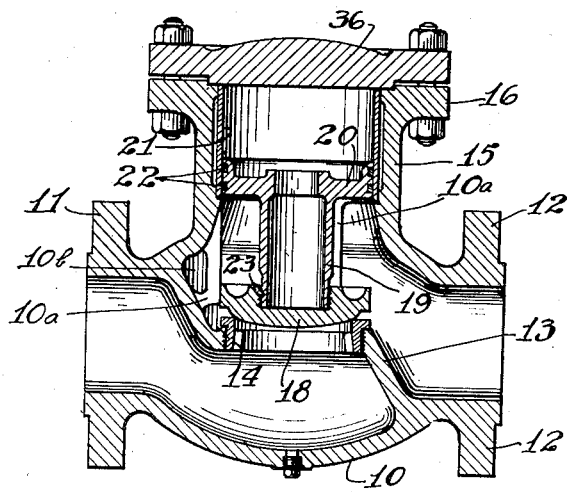

Fig. 1 illustrates my invention embodied in a stop and check valve, this view being a vertical, central, sectional view through the assembled valve, Fig. 2 is a vertical, sectional view of a part of the construction shown in Fig. 1, taken along the line 2—2, Fig. 3 is a horizontal, sectional view to an enlarged scale, of a part of the construction shown in Fig. 1, taken along the line 3—3, Fig. 4 illustrates in a view similar to Fig. 1, my invention embodied in a plain check valve construction, Fig. 5 illustrates in a view similar to Fig. 1, my invention embodied in a stop valve, and Fig. 6 is a horizontal, sectional view of a part of the construction shown in Fig. 5 taken along the line 6—6.

Similar numerals refer to similar parts throughout the several views.

As shown in Fig. 1, my valve construction consists of a body 10 having end flanges 11 and 12 for connection with desired piping, the body having a partition 13 extending across its interior, provided with a threaded opening to receive a threaded valve seat 14 co-axially with a tubular extension 15 projecting upwardly from the body 10. The upper end of the extension 15 is provided with a flange 16 to which the flange of a bonnet 17 is secured by bolts or studs as indicated.

The valve seat 14 co-operates with a valve disk 18 provided with a central, threaded bore in threaded engagement with the lower end of a tubular member 19 extending downwardly from a piston 20 mounted for sliding movement vertically in a tubular liner 21 rigidly supported in the extension 15. The piston 20 is provided with piston rings 22 so that a desired fit of the piston in the liner may be secured. The tubular member 19 is preferably held in engagement with the valve disk 18 by a set screw 23.

The piston 20 is provided with a bushing 24 to receive with a sliding fit, the lower end of a stem 25, which stem extends upwardly with a sliding fit, through a bushing 26 carried by the bonnet 17.

The part of the stem in the bushing 26 is of smaller diameter than the lower portion of the stem, forming a shoulder 25a closely fitting the lower surface of the bushing 26, when the stem is in its uppermost position, to reduce leakage around the stem to a minimum. The stem is threaded at its upper portion as illustrated at 25b, and is preferably flattened at its upper end as illustrated at 25c to engage a hand wheel 27 having a central aperture of a conformation to fit the end of the stem, said hand wheel being held in place on the stem by a nut 28. The threaded portion 25b of the stem is in threaded engagement with and extends through a threaded bushing 29 rigidly carried by the upper end of the bonnet 17, and said bonnet is provided with a gland 30 for holding packing 31 snugly against the stem. Between the packing 31 and the bushing 26, the bonnet 17 is provided with a condensation chamber 32 to collect the fluid that may seep between the stem 25 and the bushing 26 when the valve is in use.

As more clearly shown in Fig. 2, the gland 30 is provided at its upper end with outwardly extending lugs engaged by bolts 33 which also engage projections from the bonnet 17, to hold the gland in place during the use of the valve. The gland is preferably provided with a liner 34 around the stem 25, to provide a good bearing surface for the stem. The several bushings and liners are preferably made of bronze or other alloy that will afford smooth bearing surfaces. As indicated in Fig. 2, the bonnet 17 is provided with a screw plug 35 to permit opening the condensation chamber 32 when desired.

The valve disk 18 is circular and is provided with an outer cylindrical surface co-axial with the stem 25, said cylindrical surface being in sliding engagement with the inner edge surfaces of a plurality of ribs 10a extending from the body 10 in spaced relation around the valve disk above the partition 13, as illustrated in Fig. 3, with their inner edge surfaces parallel with the stem 25. Each of the ribs 10a is provided with an aperture 10b through it, of as large an area as mechanical stability of the rib will permit, to the end that the fluid passing through the valve seat 14 and upwardly around the outer edge of the valve disk 18, may not be appreciably impeded by the ribs, as would be the case if the ribs were not apertured.

The valve disk 18, the tubular extension 19, and the piston 20 constitute a unitary structure movable upwardly for fluid flow from left to right through the valve body for normal flow of the fluid. The piston 20 in co-operation with the liner 21 and the bonnet 17 prevents rapid movement of the valve disk 18 away from and towards its seat, and the rapidity of response of the disk and attached parts to changes of fluid flow, may be controlled by the fit of the piston rings 22 in the liner 21, it being desirable that the outer cylindrical surface of the piston 20 shall be slightly smaller in diameter, than the bore of the liner 21.

The stem 25 at its lower end portion, is of the smallest diameter that will give the requisite strength to the stem to positively hold the valve disk 18 in its closed position when desired, and a small clearance is provided between the stem and the inner wall of the tubular extension 19, the thickness of the wall of the extension 19 being no more than required to impart the requisite strength to the construction. In this manner the tubular extension 19 affords a minimum restriction to the flow of fluid around it when the valve disk 18 is away from its seat, and this, together with the perforations 10b in the ribs 10a, provides that the pressure at the delivery end of the valve body is but slightly less than the pressure at the admission end of the valve body when the fluid flows in its normal direction upwardly through the valve seat.

It will be noted that the valve disk and piston assembly is guided in its vertical movement at three points, first by the ribs 10a, second by the engagement of the piston rings 22 with the liner 21, and third by the engagement between the piston bushing 24 and the stem 25. This insures free movement of the valve disk and piston and positive guiding of the valve disk to correct seating on the valve seat 14, without undue wear between the valve disk and the seat, which occurs where the taper of the engaging surfaces of the valve disk and seat are relied upon to direct the valve disk to its centered position relatively to the valve seat.

Where it is desired to use the construction described as a plain check valve, the arrangement illustrated in Fig. 4 is used. It will be noted that the valve body 10, the guiding ribs 10a, the valve seat 14, the valve disk 18, the tubular extension 19 and the piston 20, the piston rings 22 and the liner 21 are identical with the parts described in connection with Fig. 1, the difference being in this case, that the bonnet 17 and the stem 25 carried thereby are not used, and are replaced by the solid cover 36. In cases where the structure has previously been used as a stop and check valve, the bushing 24 may remain in the piston 20, but where the parts are originally assembled as a plain check valve, the bushing 24 is preferably omitted.

The construction illustrated in Fig. 4 operates as a plain check valve in the same manner that the corresponding parts operate with the construction illustrated in Fig. 1 when the stem 25 is in its upper position releasing the valve disk 18.

With the construction illustrated in Fig. 5, the same valve body 10, valve seat 14 and valve disk 18 are employed as illustrated in Fig. 1, and the bonnet 17 is replaced by a bonnet 37 having upwardly extending yoke posts 38, 38 supporting at their upper ends, a yoke 39 provided with a bushing 40 which is extrenally threaded to fit corresponding threads in the yoke 39, and internally threaded to engage a threaded stem 41 having a hand wheel 27a rigidly secured to its upper end. The bonnet 37 is provided with a gland 42 for holding stem packing 43 in place in the bonnet around the stem, in substantially the manner above described for the construction illustrated in Fig. 1, the bonnet being preferably provided with a condensation chamber 44 for the purpose above described in connection with the condensation chamber 32 shown in Fig. 1.

The lower end of the stem 41 is grooved at 41a to receive the two halves of a split ring 45 extending outwardly beyond the cylindrical surface of the stem 41, for engagement with a counterbore in a disk nut 46 provided at its lower end with external threads fitting the threads in the valve disk 18. The stem 41 serves to positively hold the valve disk 18 against its seat in the same manner that said disk is so held by the stem 25 above described, when the stem is moved to its lowermost position, the difference being in this case, that when the stem 41 is moved upwardly, the split ring 45 through the disk nut 46, positively raises the valve disk from its seat to open the valve, and the construction illustrated in Fig. 5 is thus a plain stop valve.

The relation of the parts of the split ring 45 to the stem 41 and the disk nut 46, is more clearly illustrated in Fig. 6.

It will be noted that the advantage above described in connection with Fig. 1, of free flow through the valve body 10 when the valve disk is in its open position, is also obtained with the constructions of Figs. 4 and 5.

In the commercial manufacture of valves of the kind described, where the valves are intended to control the flow of fluids having corrosive effects, and particularly where valves of substantial size are required and high temperatures must be dealt with, it is of importance that the valve seats and the valve disks shall be of non-corrosive alloy or metal, which is relatively expensive, whereas the valve bodies and covers or bonnets may be of cast or forged steel which is relatively inexpensive. For valves of the larger sizes, the cost of such valve seats and disks is considerable and the amount of investment required where a considerable stock of such parts must be maintained for not only different sizes of valves but also for different styles of valves, is large; by providing for the use of the same valve seats and disks in valves of different styles for the same size valve, the cost of stocking the valves and valve parts is much reduced. Similarly by using the same piston and piston ring constructions for stop and check valves and for check valves, the cost of maintaining a stock of these parts is materially reduced, and by the use of piston rings as described, the pistons may be of relatively inexpensive material for example cast steel, and the piston rings may be of non-corrosive alloy or metal to withstand the wear to which they are subjected.

The split ring 45 is preferably of non-corrosive metal or alloy and the stem 41 is preferably of similar material. The use of the split ring 45 as described, materially cheapens the cost of construction of the stop valves, by permitting the use of smaller diameter stock in making the stem 41, than would be required if the material for the stem originally was of a sufficiently large diameter to make a flange on the lower end of the stem corresponding with the ring 45, and furthermore the labor involved in turning and finishing the stem is much reduced.

From the above it will appear that by my invention I have produced a system of valve construction materially improving and cheapening such construction, without in any way decreasing the effectiveness and efficiency of the construction for any of the purposes described, by making the principal parts interchangeable, as well as improving the construction of such valves by the means employed to positively guide the valve disk and provide for free flow of fluid through the valve bodies.

While I have shown my invention in the particular embodiment above described, it will be understood that I do not limit myself to this exact construction as I may employ equivalents known to the art at the time of the filing of this application without departing from the scope of the appended claims.

What I claim is:

1. In a valve construction, the combination of a valve body having inlet and outlet openings and a third opening for receiving valve disk controlling devices, said body having an apertured partition between said inlet and said outlet openings, a valve seat mounted in the aperture in said partition, a valve disk cooperating with said seat and movable therefrom towards said third opening, said body having integral internal and spaced ribs provided with parallel inner edge faces parallel with the path of travel of said disk and in guiding engagement with the edge of said disk, said ribs having apertures for the free flow of fluid therethrough, a closure for said third opening, said body having a bore coaxial with said disk, and a piston in said bore and connected with said disk.

2. In a valve construction, the combination of a valve body having inlet and outlet openings and a third opening for receiving valve disk controlling devices, said body having an apertured partition between said inlet and said outlet openings, a valve seat mounted in the aperture in said partition, a valve disk cooperating with said seat and movable therefrom towards said third opening, said body having integral internal and spaced ribs provided with parallel inner edge faces parallel with the path of travel of said disk and in guiding engagement with the edge of said disk, said ribs having apertures for the free flow of fluid therefrom, a closure for said third opening, said body having a bore coaxial with said disk, and a piston in said bore and connected with said disk, said piston having piston rings in sliding engagement with said bore.

3. In a valve construction, the combination of a valve body having inlet and outlet openings and a third opening for receiving valve disk controlling devices, said body having an apertured partition between said inlet and said outlet openings, a valve seat mounted in the aperture in said partition, a valve disk cooperating with said seat and movable therefrom towards said third opening, said body having integral internal and spaced ribs provided with parallel inner edge faces parallel with the path of travel of said disk and in guiding engagement with the edge of said disk, said ribs having apertures for the free flow of fluid therethrough, a closure for said third opening, said body having a bore coaxial with said disk, and a piston in said bore and connected with said disk, said piston being spaced from said disk, and said connection between said piston and said disk comprising a cylindrical element of small diameter affording minimum restriction to fluid flow through said body.

4. In a valve construction, the combination of a valve body having inlet and outlet openings and a third opening for receiving valve disk controlling devices, said body having an apertured partition extending across the interior of said body between said inlet and said outlet openings, an annular valve seat mounted in the aperture in said partition, a valve disk cooperating with said seat and movable therefrom towards said third opening to control fluid flow through said valve seat, there being a free and substantially unobstructed clearance space around said valve seat between said seat and said third opening and extending to said partition and to the inner surface of the wall of said valve body, and guiding ribs integral with said valve body and extending radially inwardly therefrom towards the axis of said valve seat and also extending substantially parallel with the axis of said valve seat towards said third opening, said ribs having substantially parallel inner edges for engaging and guiding said valve disk, said ribs having apertures therethrough permitting the free flow of fluid therethrough, whereby fluid flow through said valve seat is not materially checked by said ribs.

5. In a valve construction, the combination of a valve body having inlet and outlet openings and a third opening for receiving valve disk controlling devices, said body having an apertured partition extending across the interior of said body between said inlet and said outlet openings, an annular valve seat mounted in the aperture in said partition, a valve disk cooperating with said seat and movable therefrom towards said third opening to control fluid flow through said valve seat, there being a free and substantially unobstructed clearance space around said valve seat between said seat and said third opening and extending to said partition and to the inner surface of the wall of said valve body, guiding ribs integral with said valve body and extending radially inwardly therefrom towards the axis of said valve seat and also extending substantially parallel with the axis of said valve seat towards said third opening, said ribs having substantially parallel inner edges for engaging and guiding said valve disk, said ribs having apertures therethrough permitting the free flow of fluid therethrough, whereby fluid flow through said valve seat is not materially checked by said ribs, a member closing said third opening and having an internally threaded opening in line with said valve disk, and an externally threaded rod extending through said threaded opening and engaging the threads thereof and movable towards and from said valve disk to hold said valve disk on said seat when desired.

6. In a valve construction, the combination of a valve body having inlet and outlet openings and a third opening for receiving valve disk controlling devices, said body having an apertured partition extending across the interior of said body between said inlet and said outlet openings, an annular valve seat mounted in the aperture in said partition, a valve disk cooperating with said seat and movable therefrom towards said third opening to control fluid flow through said valve seat, there being a free and substantially unobstructed clearance space around said valve seat between said seat and said third opening and extending to said partition and to the inner surface of the wall of said valve body, guiding ribs integral with said valve body and extending radially inwardly therefrom towards the axis of said valve seat and also extending substantially parallel with the axis of said valve seat towards said third opening, said ribs having substantially parallel inner edges for engaging and guiding said valve disk, said ribs having apertures therethrough permitting the free flow of fluid therethrough, whereby fluid flow through said valve seat is not materially checked by said ribs, a member closing said third opening and having an internally threaded opening in line with said valve disk, and an externally threaded rod extending through said threaded opening and engaging the threads thereof and movable towards and from said seat, said rod having connection with said valve disk to move the latter to and from said seat.

WALTER W. MOHR.